(12) United States Patent
Reba et al.

(10) Patent No.: US 7,543,452 B2
(45) Date of Patent: Jun. 9, 2009

(54) SERRATED NOZZLE TRAILING EDGE FOR EXHAUST NOISE SUPPRESSION

(75) Inventors: Ramons Andris Reba, South Windsor, CT (US); Brian Ernest Wake, South Glastonbury, CT (US); Satish Narayanan, Ellington, CT (US); Thierry Maeder, Munich (DE)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/200,616

(22) Filed: Aug. 10, 2005

(65) Prior Publication Data
US 2007/0033922 A1    Feb. 15, 2007

(51) Int. Cl.
F02K 1/00        (2006.01)
(52) U.S. Cl. .................. 60/770; 60/39.5; 60/226.1
(58) Field of Classification Search ............... 60/226.1, 60/262, 770, 771, 39.5; 239/265.19, 265.27, 239/265.39; 181/213
See application file for complete search history.

(56) References Cited

U.S. PATENT DOCUMENTS

| | | | | |
|---|---|---|---|---|
| 3,161,257 | A * | 12/1964 | Young | 181/219 |
| 3,568,792 | A * | 3/1971 | Urguhart | 181/215 |
| 3,910,375 | A * | 10/1975 | Hache et al. | 181/215 |
| 4,077,206 | A * | 3/1978 | Ayyagari | 60/262 |
| 4,149,375 | A | 4/1979 | Wynosky et al. | |
| 4,302,934 | A * | 12/1981 | Wynosky et al. | 60/262 |
| 4,401,269 | A * | 8/1983 | Eiler | 239/265.17 |
| 4,543,784 | A * | 10/1985 | Kirker | 60/262 |
| 4,548,034 | A * | 10/1985 | Maguire | 60/262 |
| 4,576,002 | A * | 3/1986 | Mavrocostas | 60/262 |
| 4,707,899 | A * | 11/1987 | Singer | 29/890.01 |
| 4,786,016 | A * | 11/1988 | Presz, Jr. et al. | 244/130 |
| 4,850,535 | A * | 7/1989 | Ivie | 239/265.39 |
| 5,450,720 | A * | 9/1995 | Vuillamy et al. | 60/770 |
| 5,992,140 | A * | 11/1999 | Hammond et al. | 60/262 |

(Continued)

FOREIGN PATENT DOCUMENTS

GB       2119859 A  * 11/1983
GB       2 289 921      12/1995

OTHER PUBLICATIONS

Samimy, Zaman and Reeder, "Effect of Tabs on the Flow and Noise Field of an Axisymmetric Jet", AIAA Journal vol. 31, No. 4, Apr. 1993, p. 609-619, American Institute of Aeronautics and Astronaustics, Inc.

*Primary Examiner*—William H Rodríguez
(74) *Attorney, Agent, or Firm*—Carlson, Gaskey & Olds

(57) ABSTRACT

A nozzle for a gas turbine engine is provided with undulations on a core and/or fan exhaust flow nozzle. An annular wall defines a fluid flow passage and includes a base portion and an adjoining exit portion. The base portion is typically generally frustoconical in shape and includes an arcuate contour in an axial direction. The exit portion includes undulations in a generally radial direction that provide lobes and troughs each respectively including trailing edges. One of the lobe and trough trailing edges are recessed from the other of the lobe and trough trailing edges in a generally axial direction. The other of the lobe and trough trailing edges form apexes with the apexes provided on tabs. The troughs extend radially inward in the axial direction towards the trough trailing edges.

20 Claims, 5 Drawing Sheets

U.S. PATENT DOCUMENTS

| | | | |
|---|---|---|---|
| 6,082,635 A | 7/2000 | Seiner et al. | |
| 6,314,721 B1 | 11/2001 | Mathews et al. | |
| 6,360,528 B1 | 3/2002 | Brausch et al. | |
| 6,487,848 B2 | 12/2002 | Zyzman et al. | |
| 6,532,729 B2 | 3/2003 | Martens | |
| 6,578,355 B1* | 6/2003 | Mundt | 60/262 |
| 6,606,854 B1* | 8/2003 | Siefker et al. | 60/262 |
| 6,640,537 B2* | 11/2003 | Tse | 60/262 |
| 6,826,901 B2 | 12/2004 | Hebert | |
| 6,935,098 B2* | 8/2005 | Bardagi et al. | 60/262 |
| 7,093,423 B2* | 8/2006 | Gowda et al. | 60/204 |
| 7,114,323 B2* | 10/2006 | Schlinker et al. | 60/204 |
| 7,246,481 B2* | 7/2007 | Gutmark et al. | 60/204 |
| 7,305,817 B2* | 12/2007 | Blodgett et al. | 60/262 |
| 7,310,939 B2* | 12/2007 | Prouteau et al. | 60/262 |
| 7,392,651 B2* | 7/2008 | Goutines et al. | 60/262 |
| 2002/0125340 A1* | 9/2002 | Birch et al. | 239/265.11 |
| 2002/0178711 A1* | 12/2002 | Martens | 60/226.1 |
| 2003/0196425 A1* | 10/2003 | Anderson | 60/204 |
| 2005/0138915 A1 | 6/2005 | Bardagi et al. | |
| 2005/0155343 A1* | 7/2005 | Gowda et al. | 60/262 |
| 2006/0213198 A1* | 9/2006 | Arbona et al. | 60/771 |

* cited by examiner

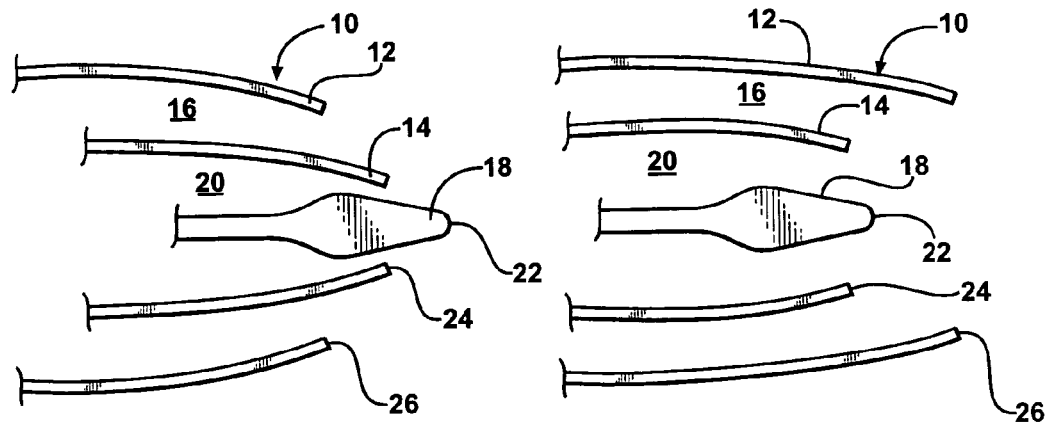
FIG - 1A PRIOR ART
FIG - 1B PRIOR ART
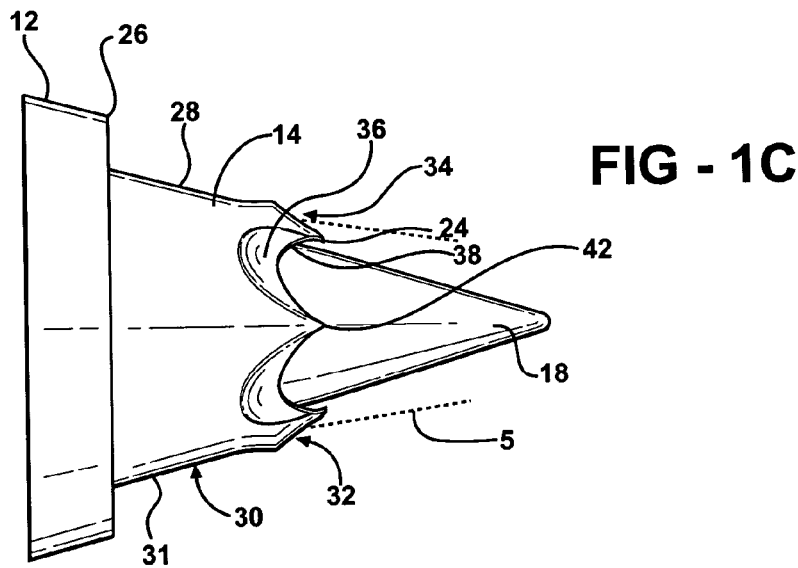
FIG - 1C
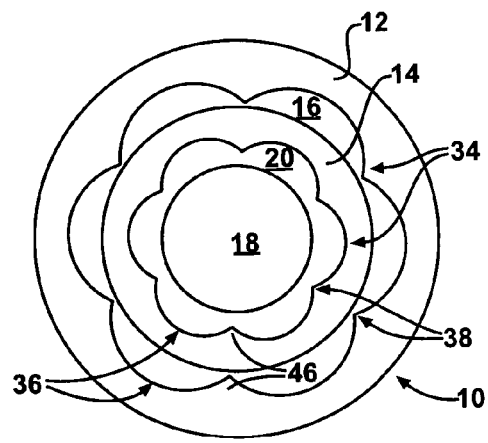
FIG - 1D

SERRATED NOZZLE TRAILING EDGE FOR EXHAUST NOISE SUPPRESSION

BACKGROUND OF THE INVENTION

This invention relates to exhaust flow nozzles, such as those used in gas turbine engines, having serrations or undulations to reduce noise.

The generation of noise from turbulent jet exhausts is of significant practical interest for low and moderate bypass ratio engines used in subsonic civil transports. The jet exhaust noise is one component of overall engine noise, and is particularly important at take-off and cutback conditions. For high bypass ratio engines, the jet noise contribution is reduced, but it is still a factor especially with continually tightening of noise restrictions.

Prior approaches to jet noise reduction have relied primarily on mixing enhancement, where the aim is to promote the exchange of momentum between the high-speed primary stream and the lower-momentum secondary flow (i.e. fan bypass and/or ambient flight stream). Tabs and chevron-type devices have been used for single stream and separate flow exhaust systems. Lobed mixers have been used for mixed-flow exhausts.

An inherent shortcoming of the aforementioned mixing devices is their tendency to generate parasitic high-frequency noise. Thus, while low-frequency noise reduction can readily approach 2-4 dB in noise spectra, reductions in overall (community) noise metrics such as Effective Perceived Noise Level (EPNL) are appreciably lower. In some instances, the high frequency noise penalty can completely offset low-frequency reduction, resulting in increased EPNL.

A second shortcoming of external plume mixing devices is adverse impact on aerodynamic performance (axial thrust). Tabs and chevrons typically increase Total Specific Fuel Consumption (TSFC), and can adversely affect nozzle discharge characteristics at off-design points in the flight envelope.

SUMMARY OF THE INVENTION

The present invention relates to a nozzle for a gas turbine engine. For example, the inventive undulations and serrations may be provided at the exit geometry of a core and/or fan exhaust flow nozzle. An annular wall defines a fluid flow passage and includes a base portion and an adjoining exit portion. The base portion is typically generally frustoconical in shape and includes an arcuate contour in the axial direction. The exit portion includes undulations in a generally radial direction that provide lobes and troughs with trailing edges. One of the lobe and trough trailing edges are recessed from the other of the lobe and trough trailing edges in a generally axial direction. The other of the lobe and trough trailing edges form apexes with the apexes provided on tabs. The troughs extend radially inward in the axial direction towards the trough trailing edges.

Numerous suitable geometries may be used to reduce noise to desired levels. The geometries are determined based upon the particular application and through mathematical modeling and empirical means.

These and other features of the present invention can be best understood from the following specification and drawings, the following of which is a brief description.

BRIEF DESCRIPTION OF THE DRAWINGS

FIG. 1A is a schematic cross-sectional view of a prior art separate exhaust flow gas turbine.

FIG. 1B is a schematic cross-sectional view of a prior art confluent or mixed exhaust flow gas turbine.

FIG. 1C is a side elevational view of an example separate exhaust flow gas turbine with the inventive undulation on the core exhaust nozzle.

FIG. 1D is an end view of both the core and fan exhaust nozzles with the inventive undulations.

DETAILED DESCRIPTION OF THE PREFERRED EMBODIMENT

Figure 2A:
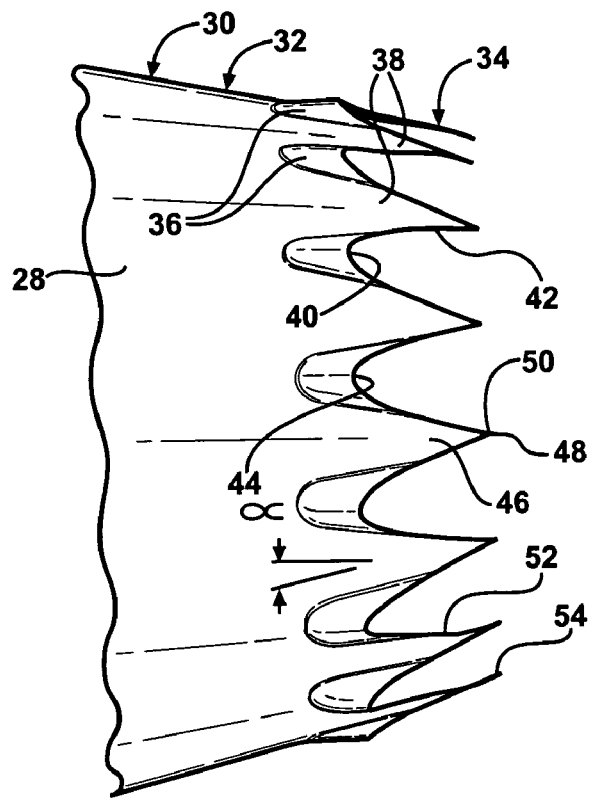
FIG. 2A is a side elevational view of an inventive exhaust nozzle.

The invention is a means for reducing jet noise emission from gas turbine engine exhausts. Applications include fan and core nozzles of separate flow exhaust (FIG. 1A) and common tailpipe nozzle of mixed flow (FIG. 1B) exhaust configurations. Gas turbine engines 10 include a fan exhaust nozzle 12 that surrounds a core exhaust nozzle 14 to provide a fan exhaust fluid passage 16. A central body 18 is arranged within the core exhaust nozzle 14, which provides a core exhaust fluid passage 20. The tip 22 of the central body 18 can extend beyond a terminal end 24 of the core exhaust nozzle 14 (as shown in FIG. 1A) or be recessed. As seen in FIG. 1A, the terminal end 24 extends beyond a terminal end 26 of the fan exhaust nozzle 12 for a separate-flow configuration. The terminal end 24 is recessed from the terminal end 26 in a mixed-flow configuration, shown in FIG. 1B.

Figure 2B:
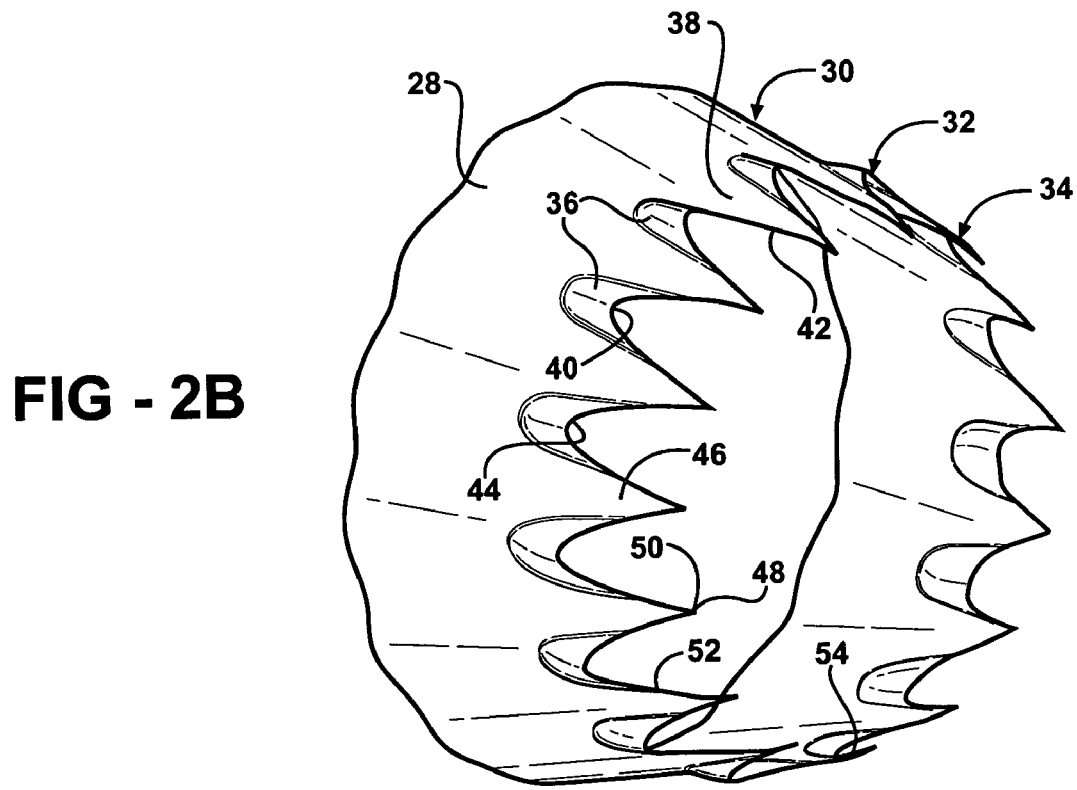
FIG. 2B is a perspective view of the exhaust nozzle shown in FIG. 2A.

Referring to FIG. 1C, the invention is shown on a core exhaust nozzle 14 of separate-flow configuration. The core exhaust nozzle 14 includes an annular wall 28, which is typically circular in cross-section and frustoconical in shape when viewed from the side. The annular wall 28 includes a base portion 30. An exit portion 32 adjoins the base portion 30 and includes undulations 34. A similar nozzle with a greater number of undulations is shown in FIGS. 2A and 2B.

According to the present invention, the nozzle trailing edge includes undulations 34 to produce a pattern of lobes 36 and troughs 38 around the nozzle perimeter. The geometry of the undulations 34 is selected to reduce noise in a desired range or ranges of frequencies. Some example embodiments of the concept are illustrated in FIG. 3A-7C. Beginning with FIGS. 1C, 2A and 2B, the lobes 36 are shown recessed from the troughs 38, although this can be reversed if desired. The lobes 36 and troughs 38 extend above and below an imaginary surface S that extends along generally the same contour of base portion 30 of the annular wall 28, best seen in FIG. 1C and FIGS. 3B, 4B, 5B, 6B and 7B.

FIG. 1D illustrates fan exhaust and core nozzles 12 and 14 with the undulations 34. In the example shown, the number of undulations 34 or tabs 46 on the nozzles 12 and 14 are equal to one another. The lobes 36 are "clocked" or radially aligned with one another for improved acoustic performance characteristics.

Figure 3A:
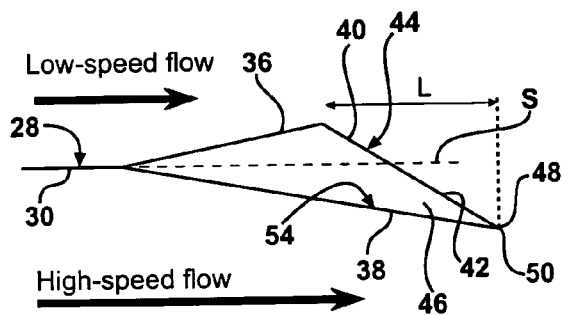
FIG. 3A is a schematic side view of a lobe recessed relative to a trough.
Figure 3B:
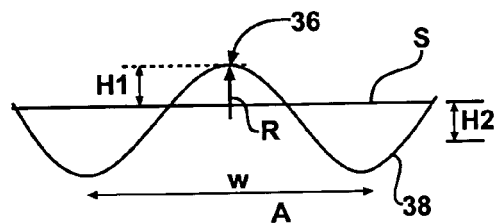
FIG. 3B is a schematic end view of the lobe and trough shown in FIG. 3A.

Specific examples of lobe shapes and trailing-edge plan forms are shown in FIGS. 3A-7C. In one variant shown in FIGS. 3A-3C, the lobe trailing edge 40 is recessed relative to the trough trailing edge 42 similar to FIGS. 2A and 2B. As seen in FIGS. 3A and 3B, the lobes 36 extend radially a distance R from an axis A a height H1 above the imaginary surface S. Similarly, the troughs 38 extend radially below the imaginary surface S by a height H2. Although the heights H1 and H2 are different when taken from the trailing edges 40, 42 as seen in the end view (FIG. 3B), the heights are generally equivalent when taken at a common axial position, which is best seen in FIG. 3A. However, it should be understood that the heights of the lobes 36 and troughs 38 could vary. The undulations 34 are sinusoidal and have a spacing, or width, W. The height/width ratio is preferably less than 1.

Figure 3C:
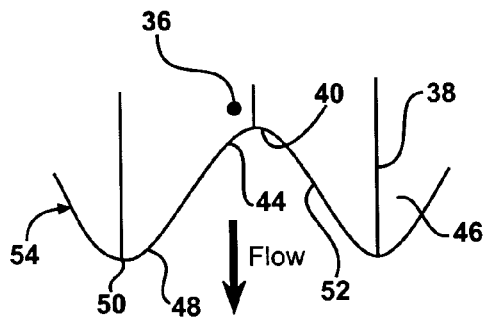
FIG. 3C is a schematic top view of the lobe and trough shown in FIG. 3A

A table of various geometric characteristics is shown below:

The lobe angle, a, is shown in FIG. 2A. The axial lobe contour, which is provided on the lobe trailing edge 40, is shown in FIG. 3C and is a cosine shape. The tab shape, which is provided on the trough trailing edge for geometries where the troughs provide the tabs (FIG. 3C), can be of a sinusoidal function, for example. The tab shape, or apex angle, may be very steep thereby forming a cusp. Any suitable lobe/trough count may be provided.

Figure 4A:
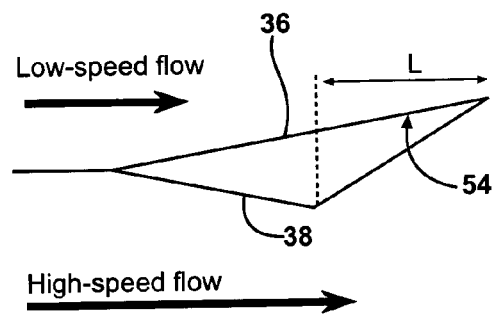
FIG. 4A is a schematic side view of a trough recessed relative to a lobe.
Figure 4B:
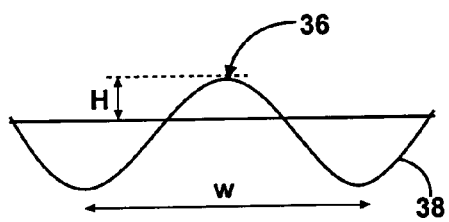
FIG. 4B is a schematic end view of the lobe and trough shown in FIG. 4A.
Figure 4C:
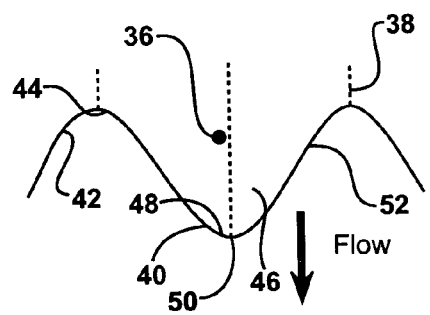
FIG. 4C is a schematic top view of the lobe and trough shown in FIG. 4A.
Figure 5C:
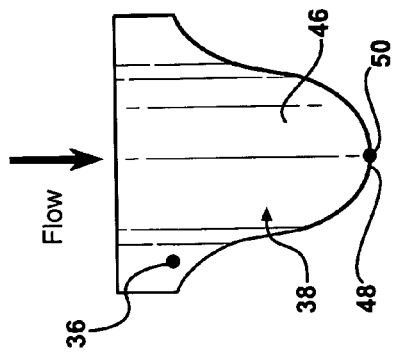
FIG. 5C is a top elevational view of the lobe and trough shown in FIG. 5A.
Figure 6C:
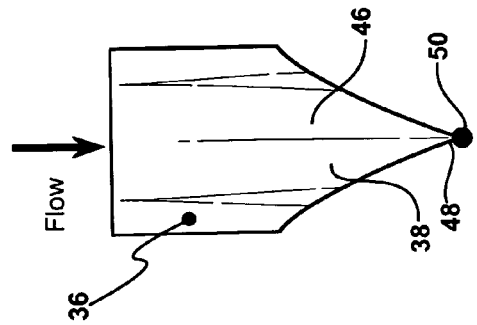
FIG. 6C is a top elevational view of the lobe and trough shown in FIG. 6A.
Figure 5B:
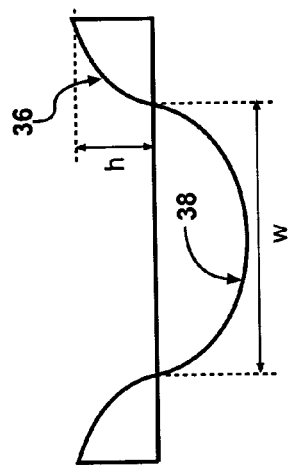
FIG. 5B is a schematic end view of the lobe and trough shown in FIG. 5A.
Figure 6B:
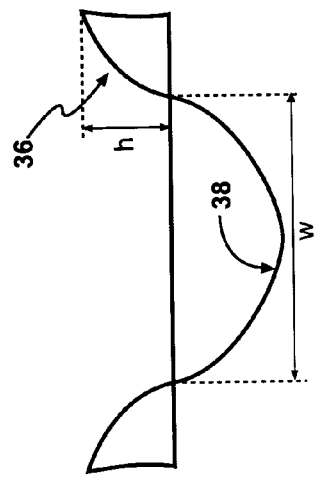
FIG. 6B is a schematic end view of the lobe and trough shown in FIG. 6A.
Figure 5A:
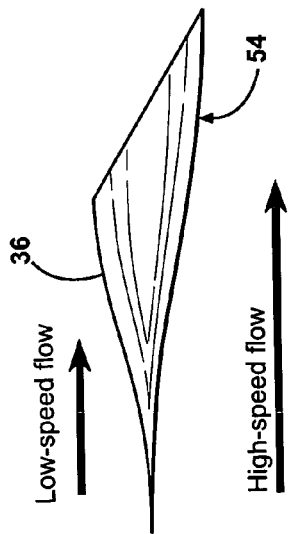
FIG. 5A is a side elevational view of one example lobe and trough shape and trailing edge shapes.
Figure 6A:
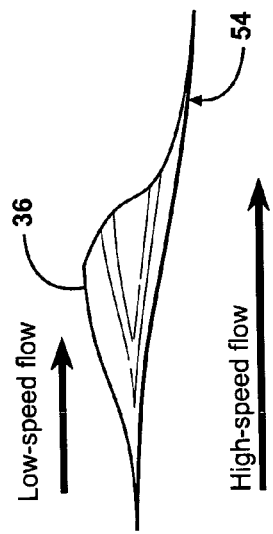
FIG. 6A is a side elevational view of another example lobe and trough shape and trailing edge shapes.

In a second variant shown in FIGS. 4A-4C, the trough trailing edge 42 is recessed relative to the lobe trailing edge 40. Another variation is shown in FIGS. 5A-5C, and includes tabs 46 having curved apexes 48 having a terminal point 50 similar to the geometries shown in FIGS. 3A-4C. FIG. 6A-7C have triangular-like tabs 46 that come to sharp points at their apexes.

Figure 7A:
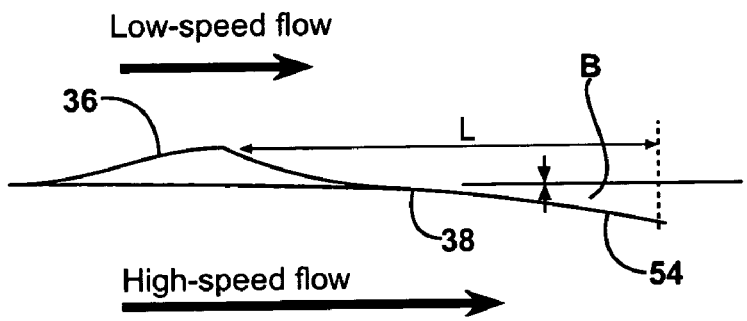
FIG. 7A is a side elevational view of yet another example lobe and trough shape and trailing edge shapes.

The tab penetration angle $\beta$ is best shown in FIG. 7A. The tab contour 54 may be parabolic to obtain a desired circulation. The length L of the tabs 46 relative to the recesses 44 may be selected as desired.

The principle of operation is that the modified nozzle trailing edge introduces an axial component of vorticity in the jet plume by re-orienting circumferential vorticity. The axial vorticity induces radially outward motion in the downstream jet plume, promoting entrainment and mixing of low-momentum ambient flow into the high-speed jet stream. This in turn disrupts and attenuates large-scale turbulent structures in the plume, reducing low-frequency noise emission. The axial vorticity and associated mixing in the near-nozzle region typically causes parasitic noise at high frequencies, reducing the overall noise benefit. Another disadvantage to the introduction of an axial component of vorticity is the loss of thrust due to non-axial velocity components. To minimize the high frequency noise and thrust loss, this invention utilizes extra degrees of freedom enabled by a combined lobe-tab geometry (a three-dimensional nozzle contour). A judicious design of the nozzle trailing edge contouring creates an axial component of vorticity in a form that minimizes high-frequency noise and thrust penalty. The unique geometry enables modification of the size, strength, location, spacing and distribu-

|  | | Range Studied | | | |
| --- | --- | --- | --- | --- | --- |
| Design Parameter | Preferred | Min | Max | Variants | Comments |
| h/w | 0.10 | 0.00 | 0.20 | | Lobe Height normalized by width; larger values create more circulation at the tab base. h/w = 0 corresponds to no undulation (conventional tab) |
| Lobe Angle (deg) | 14 to 18 | 0 | 26 | | Mean angle of lobe in axial direction; Steeper lobe creates more vorticity. |
| Axial Lobe Contour | Cosine | | | | Tangent to boattail angle at lobe onset, tangent to thrust direction at the end of lobe. Max angle is about 1.56X larger than mean angle. |
| Circumferential Lobe Contour | Sinusoidal | | | Square | Steeper walls in circumferential direction creates more circulation, but more losses and higher concentrations of vorticity. |
| Tab Shape | $\sin^{0.5}$ | | | Triangular; sharper than $\sin^{0.5}$ with larger base; rounded. | |
| Tab/Lobe Count | 6 to 12 | | | | |
| Tab Penetration Angle (deg) | 2 to 4 | 0 | 9 | | Low angles are preferred to reduced high frequency penalty and thrust loss. High penetration provides higher circulation, gentle tabs have been found to be most effective for noise. With lobes to enhance circulation, tab penetration can be even less. |
| Tab Penetration Contour | Parabolic | | | Straight; Parabolic with various initial angles. | Constant curvature with initial angle alligned with boattail angle found to be most effective for producing a desirable circulation distribution and minimal drag penalities | tion of the induced axial vorticity that organizes into mixing structures in the plume. As a result, higher overall noise reduction is achieved with reduced penalty at the annoyance-weighted high frequencies. Furthermore, the nozzle trailing edge undulation and tab-like features provides additional design parameters to help achieve desired nozzle discharge characteristics (such as for choked convergent and convergent-divergent nozzles).

Figure 7B:
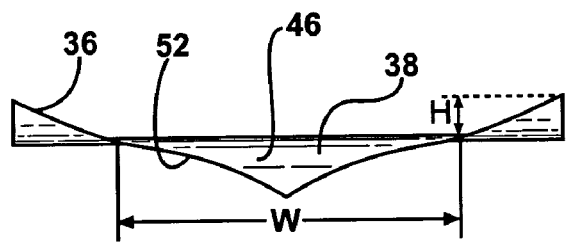
FIG. 7B is a schematic end view of the lobe and trough shown in FIG. 7A.
Figure 7C:
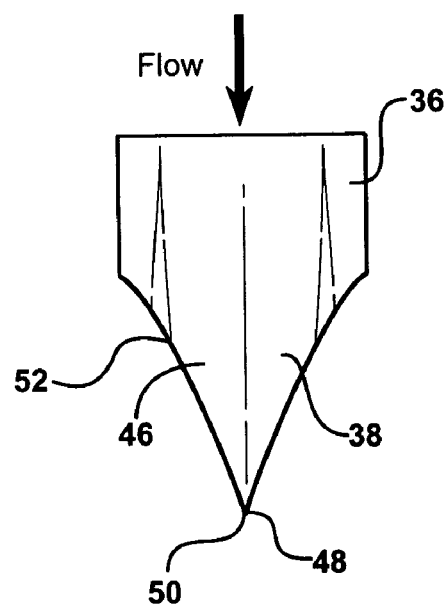
FIG. 7C is a top elevational view of the lobe and trough shown in FIG. 7A.

Referring to the configuration shown in FIGS. 7A-7C, features of this design are non-vertical lobe side walls, curvature of the trough edges, and curvature of the trough base or contour 54. The contouring, lobe shape, and ratio h/L are selected to balance the amount of vorticity shed from the lobe and trough regions, to avoid formation of high vorticity concentrations, and locate and/or space the centers of vorticity in an advantageous manner. The preferred lobe features such as shape and h/w ratio are distinct from prior art for lobed mixers in that the side-walls are substantially non-vertical (so as to avoid high concentrations of vorticity and mixing) and the h/w ratios are usually of order 1 or smaller, significantly lower than ratios of 4-6 characteristic of lobed mixers. Axial vorticity generated by this configuration was obtained using Reynolds-averaged Navier Stokes computations.

By comparison of computational results, prior art chevron-type triangular tabs are seen to produce local vorticity concentrations in the tab base region, with opposite-signed vorticity from adjacent tabs tending to migrate together. In contrast, the current invention produces a more distributed, less-concentrated pattern. Simulations indicate that distributing the vorticity reduces mixing noise associated with formation of small (relative to w) flow scales in the initial shear layer.

A second embodiment of the invention, applied to the core nozzle of a separate flow exhaust, is shown in FIG. 1C. Reynolds-averaged Navier Stokes computations have shown that for separate flow exhausts, delaying interaction of the primary and secondary shear-layers reduces high-frequency mixing noise at a given level of circulation. The location where the turbulence levels are high for the undulated serrated nozzle of FIG. 1C is farther downstream compared to that for the tab/Chevron case. The flow field from the nozzle proposed in the present invention can be tailored to generate vorticity (centered closer to the tab-like protrusion) to promote radially-inward migration of the mixing structures and thereby delay of the core-fan and fan-ambient shear-layer interaction.

The invention reduces high-frequency mixing noise penalty. Additional geometric parameters afforded by the invention enable tailoring the vorticity distribution to mitigate parasitic mixing noise. As a result, higher overall noise reduction is achieved. In particular, it has been shown that introducing tip-centered vorticity in the primary shear-layer of separate flow exhausts can reduce parasitic mixing noise by delaying interaction of the primary and secondary shear layers, as compared to conventional tab or chevron having vorticity centered closer to the tab/Chevron base.

The invention reduces thrust penalty for a given level of shed circulation. For the embodiment of this invention shown in FIGS. 7A-7C, the thrust penalty may be reduced relative to a tab with similar plan form and equal shed circulation. Compared to a simple triangular tab or Chevron, drag is reduced by 42%. Thus, the current concept provides a more efficient method for producing axial vorticity or effecting mixing. The improved efficiency is due to more effective use of the tab base region. Since the base is wider, it has larger potential for circulation generation. However, in typical tab designs radial flow is restricted in this region due to limited open area between adjacent tabs. This "blockage" of the radial flow introduces a drag penalty. In the current invention, contouring of the (lobe) trough edges coupled with the lobe feature allows and enhances radial flow in the base region, producing more circulation without increasing drag penalty. Furthermore, the lobe provides a means to direct a portion of the exit exhaust in the axial direction and adjust the effective area at the nozzle exit. In this way, the undulation of the nozzle edge expands the design space enabling optimal nozzle design to reduce thrust penalty. These benefits can be realized for either external or internal plug designs. However, such nozzle designs may be more effective for internal plugs, since external plugs provide for some pressure recovery. Estimated nozzle thrust coefficients for the current invention and for conventional chevrons, indicate the potential for thrust coefficient benefits while achieving comparable levels of mixing and noise reduction.

The invention can be applied in exhaust systems requiring converging-diverging nozzle flow characteristic. Lobes around the nozzle perimeter provide regions for flow diffusion, which can be designed to meet a prescribed nozzle area distribution. This is not achievable using designs from prior art such as tabs and Chevrons, without sacrificing the level of mixing or noise reduction obtained.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A nozzle comprising:
an annular wall defining a fluid flow passage and including a base portion and an adjoining exit portion, the exit portion including undulations in a generally radial direction that provide lobes and troughs in the annular wall that each respectively including trailing edges, one of the lobe and trough trailing edges in the annular wall recessed from the other of the lobe and trough trailing edges in the annular wall in a generally axial direction, the other of the lobe and trough trailing edges in the annular wall form apexes with the apexes provided on tabs, and troughs extending radially inward in an axial direction towards the trough trailing edges.

2. A nozzle according to claim 1, wherein the troughs provide the tabs with the trailing edges that form the apexes.

3. A nozzle according to claim 2, wherein the lobe trailing edges include arcuate recesses.

4. A nozzle according to claim 1, wherein the tabs are v-shaped forming a generally sharp point providing the apex.

5. A nozzle comprising:
an annular wall defining a fluid flow passage and including a base portion and an adjoining exit portion, the exit portion including undulations in a generally radial direction that provide lobes and troughs each respectively including trailing edges, one of the lobe and trough trailing edges recessed from the other of the lobe and trough trailing edges in a generally axial direction, the other of the lobe and trough trailing edges form apexes with the apexes provided on tabs, and troughs extending radially inward in an axial direction towards the trough trailing edges; and
wherein the base portion includes a contour with an imaginary surface extending axially in the direction of the contour, the lobes extending radially outwardly of the imaginary surface and the troughs extending radially inwardly of the imaginary surface.

6. A nozzle according to claim 1, wherein the lobes are recessed from the troughs in the generally axial direction.

7. A nozzle comprising:
an annular wall defining a fluid flow passage and including a base portion and an adjoining exit portion, the exit portion including undulations in a generally radial direction that provide lobes and troughs each respectively including trailing edges, one of the lobe and trough trailing edges recessed from the other of the lobe and trough trailing edges in a generally axial direction, the other of the lobe and trough trailing edges form apexes with the apexes provided on tabs, and troughs extending radially inward in an axial direction towards the trough trailing edges; and
wherein the troughs are recessed from the lobes in the generally axial direction, the lobes extending radially outwardly at an angle approximately between 0 and 26 degrees.

8. A nozzle according to claim 7, wherein the lobes are radially spaced from the imaginary surface at approximately a height, the lobes breaking the imaginary surface and defining a distance, the height divided by the width defining a ratio of approximately 1 or less.

9. A nozzle according to claim 1, wherein a plane includes an axis of the nozzle, one of the apexes lying in the plane, and an edge of the tab that includes the one of the apexes at an angle relative to the plane providing a tab platform.

10. A nozzle according to claim 1, wherein the one of the lobe and trough trailing edges being recessed from the other of the lobe and trough trailing edges in the generally axial direction forms an arcuate contour.

11. A nozzle comprising:
an annular wall defining a fluid flow passage and including a base portion and an adjoining exit portion, the exit portion including undulations in a generally radial direction that provide lobes and troughs each respectively including trailing edges, one of the lobe and trough trailing edges recessed from the other of the lobe and trough trailing edges in a generally axial direction, the other of the lobe and trough trailing edges form apexes with the apexes provided on tabs, and troughs extending radially inward in an axial direction towards the trough trailing edges; and
wherein the lobes and troughs provide a sinusoidal circumferential contour.

12. A nozzle according to claim 1, wherein the tabs include a tab contour in the generally axial direction, the tabs extending radially inwardly near the apexes to provide a tab penetration angle relative to the tab contour.

13. A nozzle according to claim 12, wherein the tab contour is parabolic.

14. A nozzle according to claim 1, wherein the nozzle includes approximately between 6 to 12 tabs and 6 to 12 lobes.

15. A gas turbine engine comprising:
a fan exhaust nozzle arranged about a core exhaust nozzle, and a central body positioned within the core exhaust nozzle;
one of the nozzles including an annular wall defining a fluid flow passage and including a base portion and an adjoining exit portion, the exit portion including undulations in a generally radial direction that provide lobes and troughs each respectively including trailing edges, one of the lobe and trough trailing edges recessed from the other of the lobe and trough trailing edges in a generally axial direction, the other of the lobe and trough trailing edges form apexes with the apexes provided on tabs, and troughs extending radially inward in an axial direction towards the trough trailing edges.

16. The gas turbine engine according to claim 15, wherein the one of the nozzles is the core exhaust nozzle.

17. The gas turbine engine according to claim 16, wherein the apexes extend beyond a terminal end of the fan exhaust nozzle.

18. The gas turbine engine according to claim 15, wherein the one of the nozzles is the fan exhaust nozzle.

19. The gas turbine engine according to claim 18, wherein the other nozzle includes a second annular wall defining a second fluid flow passage and includes a second base portion and a second adjoining exit portion, the second exit portion including second undulations in the generally radial direction that provide second lobes and second troughs each respectively including second trailing edges, one of the second lobe and trough trailing edges recessed from the other of the second lobe and trough trailing edges in the generally axial direction, the other of the second lobe and trough trailing edges form second apexes with the second apexes provided on second tabs, and second troughs extending radially inward in an axial direction towards the second trough trailing edges.

20. The gas turbine engine according to claim 19, wherein a number of the tabs and second tabs are equal, the lobes and second lobes in radial alignment with one another.

* * * * *

UNITED STATES PATENT AND TRADEMARK OFFICE
CERTIFICATE OF CORRECTION

PATENT NO. : 7,543,452 B2
APPLICATION NO. : 11/200616
DATED : June 9, 2009
INVENTOR(S) : Reba et al.

It is certified that error appears in the above-identified patent and that said Letters Patent is hereby corrected as shown below:

Claim 8, Column 7, Line 18: Replace "the" with "an"

Signed and Sealed this

Twenty-fifth Day of August, 2009

David J. Kappos
*Director of the United States Patent and Trademark Office*